Burr S. Rogers INVENTOR
BY Victor J. Evans & Co.
ATTORNEYS

Nov. 21, 1939.   B. S. ROGERS   2,180,911
UNIVERSAL LAWN MOWER GRINDER
Filed June 7, 1938   4 Sheets-Sheet 3

Burr S. Rogers
INVENTOR

BY Victor J. Evans & Co.
ATTORNEYS

Nov. 21, 1939.  B. S. ROGERS  2,180,911
UNIVERSAL LAWN MOWER GRINDER
Filed June 7, 1938    4 Sheets-Sheet 4
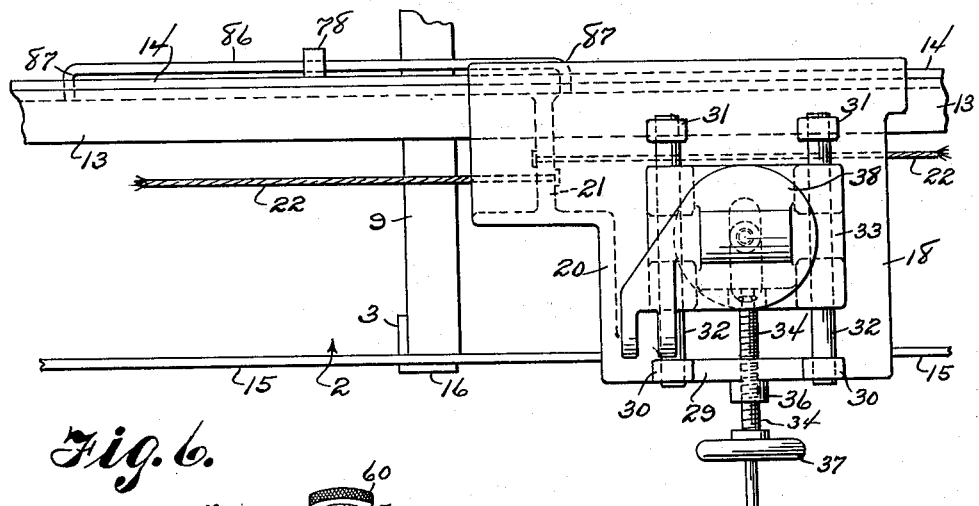
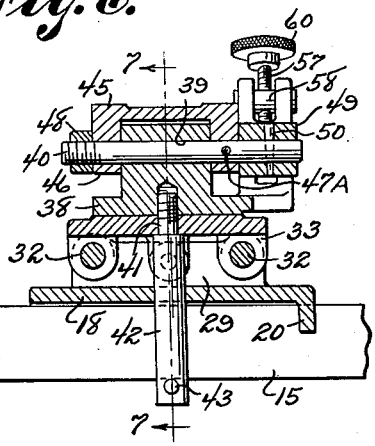
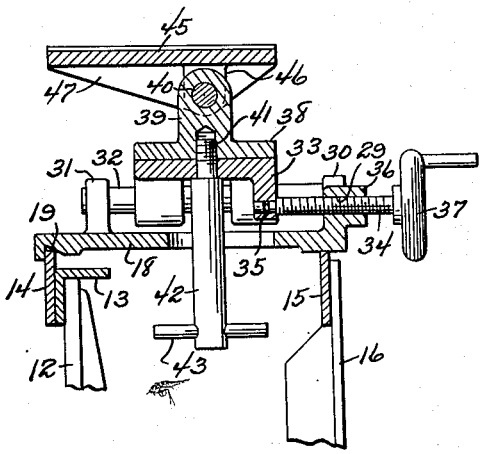
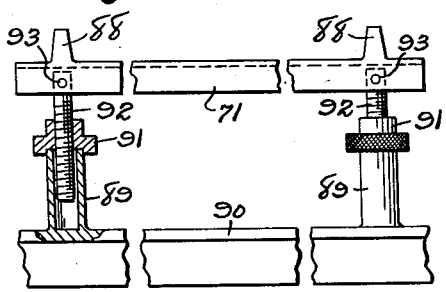
Burr S. Rogers
INVENTOR
BY Victor J. Evans & Co.
ATTORNEYS Patented Nov. 21, 1939

2,180,911

UNITED STATES PATENT OFFICE

2,180,911

UNIVERSAL LAWN MOWER GRINDER

Burr S. Rogers, Lindsey, Ohio

Application June 7, 1938, Serial No. 212,375

6 Claims. (Cl. 51—34)

This invention relates to grinding machines and more particularly to a machine for resharpening the cutter blades of a lawn mower.

The prime object of the invention is to produce a machine of universal character upon which all the necessary grinding operations on the stationary as well as the reel blades may be accomplished while the mower is completely assembled with the exception of the handle and roller and possibly the traction wheels.

An important object is to secure simplicity of structure and manipulation and at the same time attain accuracy and high efficiency in a machine upon which all of the grinding operations may be accomplished after one setup of the assembled mower upon the machine.

A further object is to produce a grinding machine which will accommodate mowers of different sizes.

With the foregoing and other objects to be attained, as will hereinafter more fully appear, the invention consists in the novel general structure and in the parts and combinations and arrangements of parts as hereinafter described and set forth with particularity in the appended claims, reference being had to the accompanying drawings illustrating a practical adaptation of the invention, and in which, Figure 1 is a front elevation of the machine;

Figure 5 is a fragmentary top plan view of the track frame and base portion of the carriage frame illustrating certain details of the adjusting means for the grinding wheel and also the adjustable spacer block against which the stationary blade of the mower is supported in the machine;

Figure 6 is a fragmentary section on the line 6—6 of Figure 2;

Figure 7 is a section on the line 7—7 of Figure 6; and

Figure 8 is a view partly in elevation and partly in section, with parts broken away to foreshorten the view, illustrating the vertically adjustable support for the mower in the machine.

Figure 1:
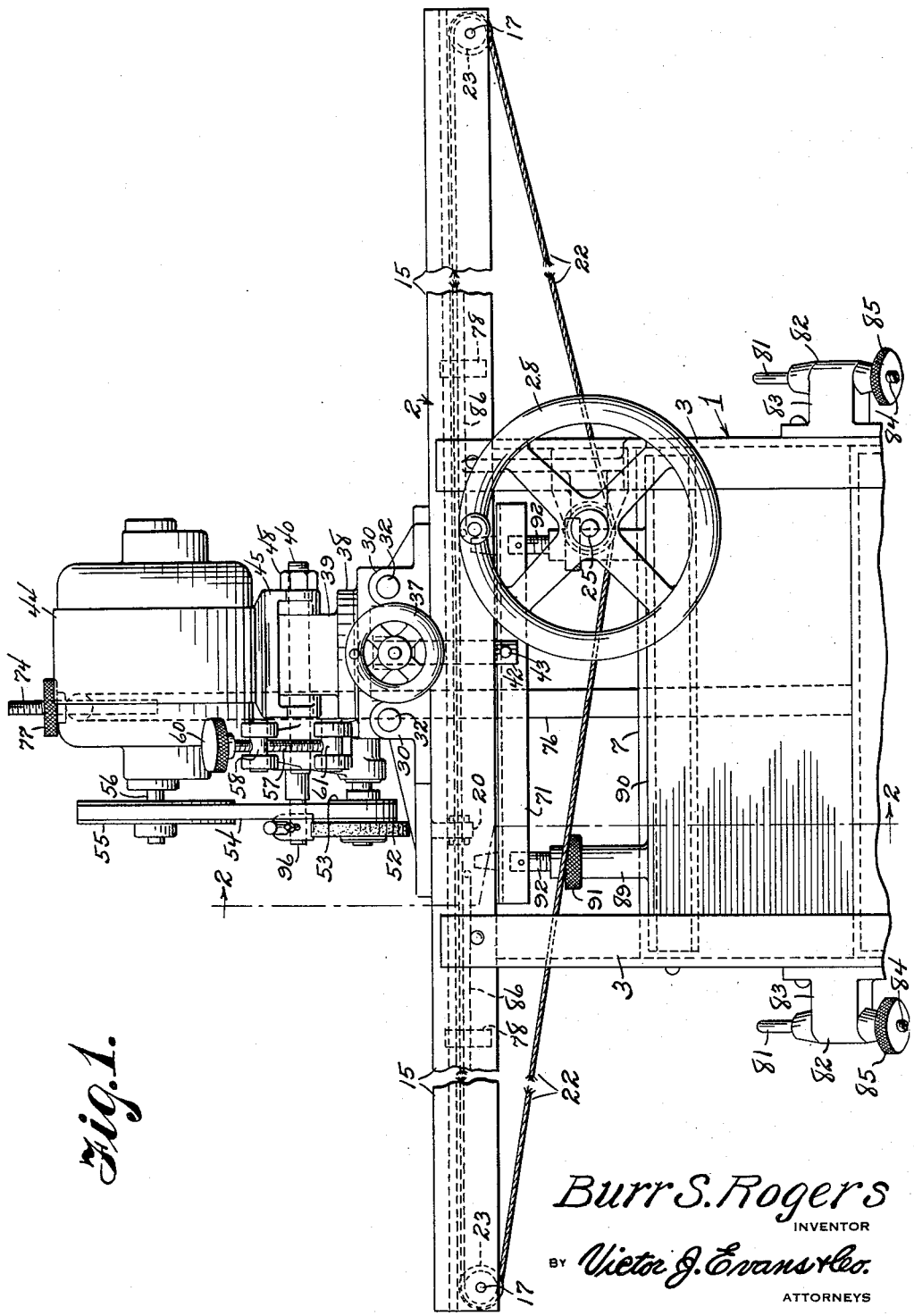

Referring now to the drawings, the numeral 1 designates generally the central pedestal portion of the supporting frame at the top of which is mounted the horizontal track way 2 which is extended on opposite sides of said central pedestal portion 1. As shown, the central supporting frame structure is constructed generally of angle iron sections including a pair of front corner uprights 3 and a pair of rear corner uprights 4, 5 said uprights being mounted on front and rear base rails 5, 6. The two rear uprights 4 are connected at their upper ends by an angular cross member 7 and at their middle portions by a similar cross member 8, while extending between said uprights 4 and the respective corner uprights 3 at the front of the frame are horizontal top members 9 and lower members 10 which are of the same angular cross section and located in the same horizontal planes as said cross members 7 and 8, respectively. The lower portion of the central pedestal frame 1 is also preferably braced by diagonal stay members 11.

Mounted on the upper horizontal cross members 9 of the central frame 1 is a pair of angular bracket members 12, to the upper end portions of which an elongated frame member 13 of angular cross section is rigidly attached, said frame member 13 having an elongated plate 14 attached thereto and constituting the inner rail member of the horizontal track way 2.

The outer rail plate 15 of the track way 2 is secured to the end portions of upper extensions 16 of said front uprights 3 of the central frame 1, said rail plates 15 being of sufficient width and thickness to prevent sagging of the end portions thereof which are projected on opposite sides of said central frame 1 and they are cross-tied to the opposite end portions of the horizontal frame member 13 which carries the inner rail plate 14, the angular cross sectional form of said frame member 13 and the combined cross dimensions of said member and the rail plate 14 being such that ample rigidity is afforded the structure to not only prevent sagging and lateral movement of said members 13 and 14 but afford a stable support to prevent lateral movement of the rail member 15, which is connected thereto by the cross rods or shafts 17.

Mounted to slide on the track rail members 14 and 15 is a carriage frame 18, one side portion of which is elongated and provided on its under side with a grooved portion 19 which rides on the inner track rail 14 while the opposite side portion merely rests flatwise on the outer rail member 15. The weight of the carriage frame 18 and the parts carried thereon is sufficient to hold the frame in its sliding contact with the rail members 14 and 15 so that the single grooved portion 19 engaging the inner rail 14 is sufficient to prevent transverse movement of the carriage and guide the carriage in its longitudinal movement on said track rails 14 and 15.

As shown, the carriage frame 18, which is in the general form of a flat plate, is reinforced on its under side at one end by a flange 20, one portion of said flange near the frame member 13 being extended downwardly, as at 21, and having the opposite end portions of a cable 22 attached thereto, said cable 22 being carried over idler pulleys 23 mounted rotatably on the cross rods or shafts 17 at the opposite ends of the track way 2 and the intermediate portion of said cable 22 being wound with several turns about a drum 24 secured on an operating shaft 25. The shaft 25, as shown, is journaled at one end in a bearing 26 provided therefor on one of the bracket members 12 which supports the inner track frame member 13, while the opposite end portion of the shaft is extended through a bearing 27 provided on the upper portion 16 of the aligned front frame member 3, the shaft being provided at its extreme outer end portion with a hand wheel 28 for rotating the shaft and the drum 24 fixed thereon. By this provision, the carriage, which is attached to the drum 24 by the cable 22, as just above described, is reciprocated on the track way during the grinding operations as will be later described.

Extending upwardly from the carriage frame 18, near the outer longitudinal margin thereof, is an elongated flange 29 having ears 30 at its opposite ends which are opposed to a pair of upstanding lugs 31 located near the inner longitudinal margin of the frame, said opposed ears 30 and lugs 31 supporting a pair of guide bars 32 on which a supporting block 33 is slidably mounted. For adjusting said block 33 on the guide bars 32, a screw element 34 has its inner end portion swiveled, as at 35, in a flange depending from the under side of the block, said screw element extending through a bearing 36 provided therefor on the upstanding marginal flange 29 of the carriage frame 18 and being provided at its outer end with a hand wheel 37.

Mounted to rotate about a vertical axis on the supporting block 33 is a supplemental block having a circular base portion 38 and an upstanding central lug 39 which is bored horizontally for the reception of a pivot pin or shaft 40 which carries a motor supporting bracket and grinding wheel adjusting arm to be presently described.

In order to provide a swiveled attachment of the supplemental support 38 on the horizontal adjustable supporting block 33 the member 38 is provided with a screw threaded axial bore to receive the screw threaded reduced end portion 41 of a shouldered stud 42 which is inserted through an aligned smooth bored opening in the supporting block 33, said stud 42 being provided with a cross handle 43 for manipulating it, and by which provision the supplemental support 38 is releasably locked in the position to which it is rotated on the member 33.

As shown, the support for a motor 44, conventionally indicated in the drawings, comprises a body plate 45 provided on its under side with bearing lugs 46 at its opposite ends and reinforced by flanges 47 coinciding with the lugs 46, said lugs being provided with aligned bores to receive the pivot pin or shaft 40 which is journaled in the upstanding lug 39 of the supplemental swiveled support 38. The lug portions 46 of the motor support 45 are pinned or otherwise suitably keyed to the pivot pin or shaft 40 so as to rotate therewith. This may be obviously accomplished by driving a cross pin 47—A through either or both of the lug portions 46 of the member 45, or, in some cases, said cross pin 47—A or special key may be eliminated and the fastening of the member 45 to the pivot pin or shaft 40 may be accomplished by tightening a nut 48 on the screw threaded end portion of said pin or shaft 40 against one of the lug portions 46 so as to draw a collar 49, pinned or keyed on the opposite end portion of said pivot pin or shaft 40, tightly against the opposite lug portion 46 of said member 45. In this connection the collar 49, which is pinned to the pivot pin or shaft 40, as at 50, is a part of the middle portion of a rock arm 51 on one end portion of which a grinding wheel 52 is mounted, said grinding wheel being provided with a pulley 53 which is connected by a belt 54 to a driving pulley 55 provided on the armature shaft 56 of the motor 44.

Obviously, as the motor support 45 and the rock arm 51 carrying the grinding wheel 52 are both fixed to move with the pivot pin or shaft 40, a single adjusting and holding means is provided in connection with said rock arm 51. As shown, this means comprises a screw element 57 provided to work through a screw threaded transverse bore provided in a cross pin 58 which is swiveled in the bifurcated end portion 59 of said rock arm 51, the screw element being provided at one end with a knurled manipulating knob 60 and its opposite end portion being swiveled in a cross pin 61, which in turn has a swiveled mounting in a pair of lug members 62 extending laterally and forwardly from the circular base portion of the swiveled supplemental support 38. By this provision, the screw element 57 is rotated to rock the arm 51 and thereby raise and lower the grinding wheel 52, and at the same time the motor support 45 accordingly rocks with the arm 51 so that the belted driving connection between the motor shaft and the grinding wheel is maintained constantly in its proper working relation in whatever position the grinding wheel is set for operation.

As thus far described, it is noted that the machine includes, in general, a reciprocatory carriage which may be actuated at will by turning the hand wheel 28, said carriage having a motor driven grinding wheel mounted thereon with provision for adjusting the grinding wheel rotatably about a vertical axis as well as vertically and transversely of the carriage, the rotatable adjustment about the vertical axis being under the control of the stud member 42 and the transverse and vertical adjustments being respectively under the control of the hand wheel 37 and the screw element 57 as hereinbefore described.

The means for locating and securing the mower assembly in place on the machine for the respective grinding operations will now be described. In this connection, it is here pointed out that the machine of the present invention is designed more particularly for grinding the cutter blades on both the stationary supporting bar and the revolving reel while the bar and reel are assembled in the body frame of the mower with only the roller element and handle removed, and the traction wheels and transmission gearing between said wheels and the reel being removed, or not, as may be desired. As shown, a cross section through the mower assembly is shown more or less conventionally, including one of the side frames 63 having the usual circular enlargement 64 at one end for housing the transmission gearing between the ground wheels (not shown) and the reel 65 which latter has the cutter blades 66 which are usually of spiral form. At the opposite end of the mower frame, slots 67 are provided in which the usual roller (not shown) is adjustably mounted. Between the slotted end portion 67 of the mower frame and the reel 65, an adjustable supporting bar 68 is provided for the regular stationary cutting blade 69. At the opposite end of the mower frame, the circular gear housing portions 64 are usually connected by a cross bar 70. As the foregoing are all that enter into the explanation of the present invention, no further description of the mower construction is deemed necessary.

For the grinding operations on both the stationary blade and the respective reel blades, there is only one setup of the mower assembly on the machine for the accomplishment of work, and for this purpose a vertically adjustable support 71 is provided upon which the supporting bar 68 for the stationary cutter blade 69 rests, said support 71 being of a length less than the distance between the two side frames 63 of the smallest sized mower to be handled in the machine, and with the bar 68 resting on the support 71 the cross bar 70 connecting the gear housing portions 64 of the mower frame is supported at its middle by a hook 72 which is attached to a chain 73 depending from the lower end of a screw element 74, which latter extends slidably without screw threaded engagement through an opening provided therefor in the forwardly extending upper end portion 75 of a crane 76 which is supported at its lower end portion on the upper and lower rear horizontal frame members 7 and 8, respectively. A nut 77 is provided on the screw element 74 to engage the arm 75 of the crane 76 whereby to effect vertical adjustment of the screw element 74 and support it in its adjusted positions. With the mower frame thus supported on the vertically adjustable support 71 and suspended from the crane 76, the mower frame is drawn tight against a pair of interposed spacer blocks 78 by a pair of chains 79 provided with hooks 80 which are engaged in the slotted portions 67 in the adjacent end portions of the side frame members 63 of the mower. The chains 79 are connected at their ends remote from the hooks 80 to pulling and holding bars 81 which are slidable endwise through diagonaly disposed supporting and guiding sleeves 82 provided on bracket members 83 which are secured on the outer sides of the front vertical frame members 3 of the pedestal frame 1, of the machine. The lower end portions of the bars 81 are screw threaded as at 84 to receive adjusting and tightening nuts 85 which abut the lower ends of the sleeves 82.

The vertically adjustable suspending means on the crane 76 is applied to the cross bar 70 midway between the side frame members 63 of the mower of whatever size it may be and the vertically adjustable support 71 is common to any size mower to be handled in the machine as said support 71 is of a length to fit between the side frame members 63 of the smallest size mower as hereinbefore stated, but the spacer blocks 78 are preferably adjustably mounted on horizontal rods 86 having in-turned end portions 87 which are attached to the track rails 14 so that their intermediate body portions extend horizontally in parallel spaced relation to the face of the rail member, by which provision said spacer blocks 78 may be moved longitudiually on said bars 86 and located near the opposite ends of the supporting bar 68 on which the stationary cutter blade 69 is mounted.

Preferably, the vertically adjustable support 71 comprises a channel shaped member which is inverted and provided on its top with a pair of transverse ribs or protuberances 88, respectively, located near its opposite ends so that the supporting bar 68 for the stationary cutter blade is out of contact with the support 71 except where it rests on said transverse protuberances 88, and to facilitate the leveling adjustment of the mower frame to properly position it for the grinding operations on the cutter blades, said support 71 is mounted at its opposite ends on separately adjustable jacks 89 comprising tubular base members extending upwardly from a horizontal angular cross member 90 connecting the upper side members 9 of the pedestal frame 1. Supported rotatably on the upper rims of the tubular members 89 are nuts 91 through which vertical adjusting screws 92 extend with their lower ends disposed within said tubular members 89 and the upper ends thereof being pivotally attached to transverse pins 93, which latter have their opposite end portions secured in the side flanges of the inverted channel member constituting the body of the support. By this provision the opposite end portions of the support 71 may be separately adjusted by manipulating either of the nuts 91 to raise or lower the respective screw elements 92, as the case may be, said screw elements being held against rotation by the cross members 93, but the hinged attachment of the screw elements with said cross members 93 permitting the necessary compensating movement of the body member of the support.

Figure 2:
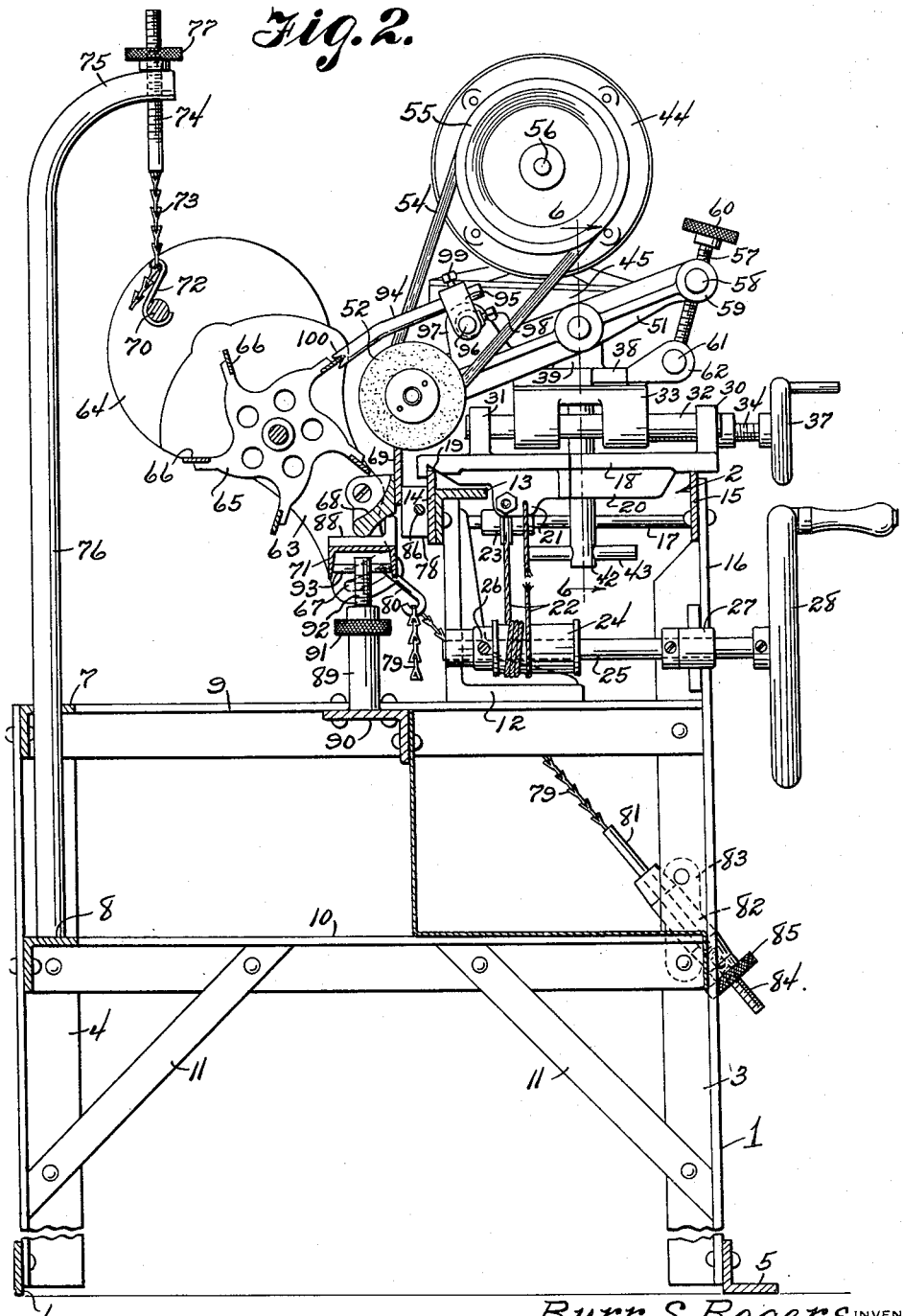
Figure 2 is a vertical cross section taken substantially on the line 2—2 of Figure 1, the grinding wheel being shown as applied in the operation of grinding the cutting edge of the stationary blade of the mower.

In the use of the machine of the present invention and with the mower assembly set up and fastened in place, as shown in Figure 2, and through the instrumentalities as hereinbefore described, the cutting edge of the stationary cutter bar 69 is first ground. For this operation and in accordance with the desired angularity to be produced in the cutting edge, the rock arm 51 is adjusted by means of the screw element 57 to position the grinding wheel 52 vertically and in addition to said vertical adjustment the grinding wheel is adjusted horizontally by manipulating the hand wheel 37. That is to say, the relative sharpness or degree of angularity of the cutting edge is determined and regulated by varying the distance between the vertical plane of the cutter blade 69 and the axis of the grinding wheel 52 and also the distance of the axis of the wheel horizontally above the cutting edge of the blade.

With the grinding wheel adjusted to its proper working position, the hand wheel 28 is rotated to reciprocate the carriage 18 on the track rails 14 and 15 so as to carry the grinding wheel while rotating under the power of the motor 44 lengthwise of the cutter blade. During this operation, in order to prevent the blades 66 on the reel 65 from being moved accidentally into engagement with the periphery of the grinding wheel 52, a guide bar 94 is mounted at one end with longitudinal adjustment on a supporting arm 95, which latter is rotatably adjustable on a stud 96 projecting horizontally from an upstanding lug 97 provided on the rock arm 51, said supporting arm 95 being secured in adjusted position by a set screw 98 and the guide bar 94 being fastened in its adjustment on the arm 95 by a set screw 99. Said guide arm 94 is provided at its opposite end with a kerf 100 to slidably engage the cutting edge portion of one of the blades 66 on the reel 65. By this provision, if the cutter blades 66 are straight, the reel 65 is held by the guide bar 95 from rotation during the reciprocation of the grinding wheel 52 with the carriage on the track rails 14 and 15, or, if said cutter blades 66 are of the usual spiral form, the reel 65 rotates on its axis during the reciprocation of the grinding wheel 52. But in such rotation of the reel the adjacent cutter blades are maintained in the same spaced relation to the periphery of the grinding wheel at every position of the wheel during its reciprocation. Obviously, therefore, an effective guard is provided against nicking or otherwise damaging the reel blades or causing injury to the operator of the machine by flying particles which might otherwise be produced.

Figure 3:
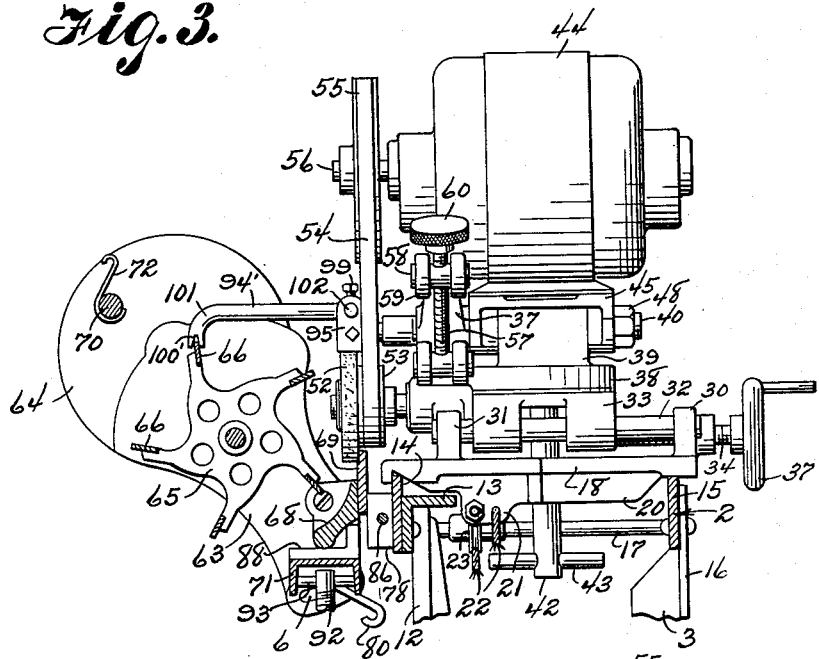
Figure 3 is a fragmentary cross section of the machine showing the grinding wheel set in operating relation to the stationary blade of the mower so as to grind the inner side face portion of the blade adjacent its cutting edge.
Figure 4:
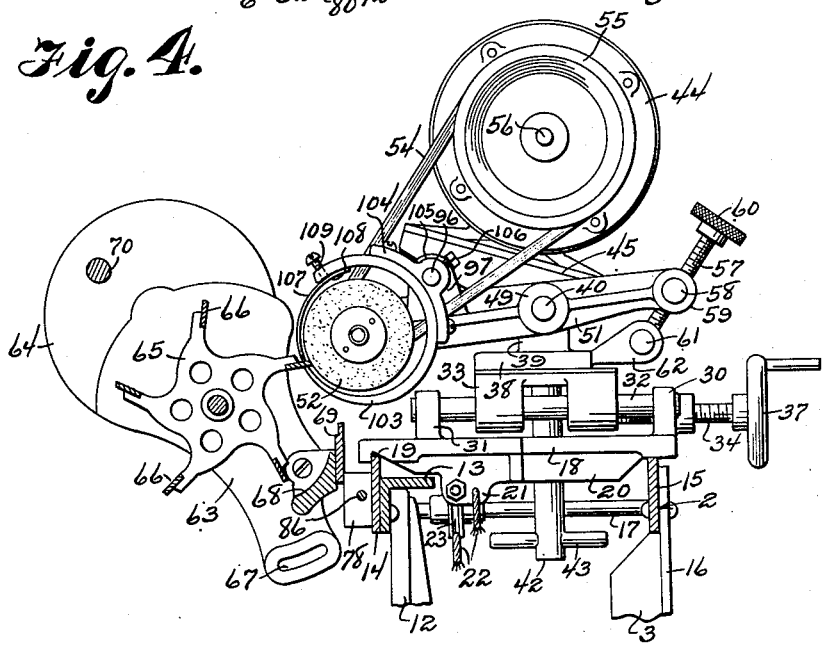
Figure 4 is a fragmentary cross section of the machine illustrating the grinding wheel in position to grind the cutting edges of the reel blades.

After the grinding operation on the cutting edge of the stationary blade 69 is completed, the stud member 42 is loosened and the supplemental swiveled support 38 is rotated on the block 33 a quarter turn or through an angle of ninety degrees from the position shown in Figure 2 to the position shown in Figure 3, in which latter position the block 33 is adjusted transversely of the carriage by manipulating the hand wheel 37 so as to properly position the grinding wheel 52 in working relation transversely with respect to the stationary blade 69 and the rock arm 51 is adjusted by manipulating the screw element 57 so as to lower the grinding wheel to a plane where the side face portion of the wheel adjacent its periphery will grind off the face portion of the blade adjacent its cutting edge with a rabbeted recessed effect and thereby produce a straight cutting edge on the blade 69 even should the blade be warped as frequently occurs in the use of the ordinary lawn mower. In this particular grinding operation on the blade 69, a different type of guide bar 94' is used instead of the hereinbefore described bar 94, because of the different position of the grinding wheel 52 relative to the reel 65, said bar 94' having a bent end portion 101 provided with a kerf 100' similar to the kerf 100 in the bar 94 for slidable engagement with one of the cutter blades 66, the opposite end portion of said modified guide bar 94' being turned angularly, as at 102, and fastened to the supporting arm 95 by the set screw 99. In this modification the reel blades 66 are likewise held from movement into engagement with the grinding wheel 52 as stated in connection with the first herein described grinding operation.

To grind the reel blades 66, the swiveled support 38 is turned from the position shown in Figure 3 back to the original position as shown in Figure 2. The grinding wheel 52, however, is adjusted to a higher position so as to have considerable clearance above the cutting edge of the sharpened stationary blade 69. In conjunction of the vertical adjustment of the grinding wheel 52 for sharpening the reel blades 66, the grinding wheel is also adjusted horizontally by shifting the supporting block 33 transversely of the carriage by manipulating the hand wheel 37.

In order to guide the reel blades 66 during the grinding operation thereon, whether said blades of straight or spiral form, a curved blade support 103 is attached to a correspondingly curved supporting bracket 104, which latter is provided with a hub portion 105 fitted on the stud 96, which projects from the lug 97 on the rock arm 51 to support the hereinbefore described guide bars 94 and 94' in place of which said curved blade support 103 is substituted for the present grinding operation, said hub portion 105 of the bracket 104 being fastened in adjusted position on the stud 96 by a set screw 106.

For this particular grinding operation the support 103 is adjusted so that the cutter blade 66 bears constantly thereon during the reciprocation of the carriage on the track rails 14 and 15 and movement of the rotating grinding wheel lengthwise of the cutter blade, and to hold the blade in engagement with the end portion of said support 103 a curved leaf spring 107 is attached, as at 108, to the inner side of the opposite end portion of said curved support 103, the free end of said spring 107 being pressed by said spring element 107 under tension which may be varied by adjusting a set screw 109 provided therefor on the end portion of the support 103 adjacent where the spring is mounted. By this provision, the blades are accurately ground whether they are of the straight or spiral type and all that remains to be done for the use of the mower is to adjust the previously ground stationary cutter blade in the usual manner by adjustment of the supporting bar 68.

From the foregoing it is apparent that a practical and highly efficient machine is produced on which the respective cutter blades, both stationary and rotatable, may be originally ground in the manufacture and assembly of the mower, but it is more particularly advantageous in regrinding the blades of a used mower.

Obviously, the general structure as well as the respective parts thereof admits of considerable modification within the spirit of the invention as defined by the appended claims. The invention, therefore, is not limited to the specific construction and arrangement shown in the accompanying drawings.

What is claimed is:

1. In a machine for grinding the stationary cutter blade and the cooperating cutter blades on the correlated reel in a lawn mower assembly, a supporting frame having a track way, means for supporting the mower assembly with the stationary cutter blade disposed in near abutting and parallel relation to one side of the track way with the reel disposed in a higher plane, a reciprocatory carriage on said track way, a supporting block mounted on said carriage with provision for horizontal adjustment transversely of the carriage, a supplemental support mounted to rotate about a vertical axis on said supporting block with means for releasably locking it in adjustment, a motor support pivotal about a horizontal axis on said supplemental support, a motor on said motor support, a rock arm movable with said motor support about the same pivotal axis, a grinding wheel on said rock arm, a driving connection between said grinding wheel and motor, and means for swinging said rock arm and releasably locking it in adjusted position whereby to set the grinding wheel in different vertical positions selectively to grind the stationary and reel blades of the motor assembly.

2. In a machine for grinding the stationary cutter blade and the cooperating cutter blades on the correlated reel in a lawn mower assembly, a supporting frame having a track way, means for supporting the mower assembly with the stationary cutter blade disposed in near abutting and parallel relation to one side of the track way and the reel disposed in a higher plane, a reciprocatory carriage on said track way, a motor-driven grinding wheel mounted on said carriage with provision for adjustment rotatably about a vertical axis, said grinding wheel also having provision for adjustment vertically and horizontally toward and from the cutter blades of the mower assembly, and guide means on said carriage slidably engaging one of the reel blades whereby to compensatingly maintain the reel blades in constant spaced relation to the grinding wheel in every longitudinal position of the latter while it is operating in grinding relation to the stationary cutter blade during reciprocation of the carriage on the track way, said guide means comprising a bar notched at one end for the slidable engagement with the reel blade and adjustably mounted at its opposite end on the grinding wheel mounting of the carriage whereby to compensate for the various working adjustments of said grinding wheel.

3. In a machine for grinding the stationary cutter blade and the cooperating cutter blades on the correlated reel in a lawn mower assembly, a supporting frame having a track way, means for supporting the mower assembly with the stationary cutter blade disposed in near abutting and parallel relation to one side of the track way with the reel disposed in a higher plane, a reciprocatory carriage on said track way, a motor-driven grinding wheel mounted on said carriage with both vertical and horizontal adjustment toward and from the reel blades of the mower assembly positioned on the machine frame, guide means mounted to move with the grinding wheel in its various adjustments in grinding relation to one of the reel blades and having provision for slidably engaging and supporting said blade progressively at every point throughout the length of the blade as the grinding wheel travels in its grinding relation to the blade during the reciprocation of the carriage, said guiding means including an arcuate support located about the periphery of the grinding wheel and movable with the wheel during its travel with the carriage in its grinding relation to the blade, and a spring element secured at one end to one end of said support with its opposite end free but adjacent to the opposite end of the support for yieldably pressing the blade thereon.

4. In a grinding machine of the character described, a supporting frame having an elongated horizontal track way thereon, a vertically adjustable support on said frame adjacent one side of the track way, means for suspendedly supporting the forward portion of a mower assembly with the supporting bar for the stationary cutter blade at the rear of the assembly resting on said vertically adjustable support, tie means engaging the opposite sides of the mower frame for holding the supporting bar for the stationary cutter blade in near abutting relation to the adjacent side of the track way, a reciprocatory carriage on said track way, manually manipulable means for actuating said carriage, a transversely adjustable support on said carriage, a supplemental support swiveled about a vertical axis on said transversely adjustable support with means for releasably locking it in rotatable adjustment, a motor-driven grinding wheel mounted on said supplemental swiveled support with provision for vertically swingable adjustment about a horizontal axis, and means for moving said grinding wheel and releasably holding it in its various adjustments.

5. In a grinding machine of the character described, a supporting frame having an elongated horizontal track way thereon, a vertically adjustable support on said frame adjacent one side of the track way, means for suspendedly supporting the forward portion of a mower assembly with the supporting bar for the stationary cutter blade at the rear of the assembly resting on said vertically adjustable support, tie means engaging the opposite sides of the mower frame for holding the supporting bar for the stationary cutter blade in near abutting relation to the adjacent side of the track way, a reciprocatory carriage on said track way, manually manipulable means for actuating said carriage, a transversely adjustable support on said carriage, a supplemental support swiveled about a vertical axis on said transversely adjustable support with means for releasably locking it in rotatable adjustment, a motor-driven grinding wheel mounted on said supplemental swiveled support with provision for vertically swingable adjustment about a horizontal axis, means for moving said grinding wheel and releasably holding it in its various adjustments, and adjustable guide means movable with said grinding wheel in fixed relation thereto on said supplemental swiveled support during the grinding operation on the stationary cutter blade of the mower assembly positioned on the machine, said guide means slidably engaging one of the reel blades whereby to compensatingly maintain the reel blades in constant spaced relation to said grinding wheel during such operation.

6. A machine for grinding the stationary cutter blade and cooperating cutter blades on the correlated reel element in a lawn mower assembly, comprising a supporting frame having an elongated horizontal track way thereon, means for supporting the mower assembly in relation to the track way for the respective grinding operations on both the stationary and reel blades, said means including a crane extending upwardly from the machine frame and having a vertically adjustable element for suspendedly supporting the forward portion of the mower assembly, a substantially horizontal support mounted for separate vertical adjustment at its opposite ends on the machine frame adjacent the track way, said horizontal support being of a length less than the distance between the side members of the mower frame and having provision on its upper side and near its opposite ends for receiving and supporting the supporting bar for the stationary cutter blade in spaced relation thereto, adjustable spacer blocks on the adjacent side of the track way, adjustable tie means engaging the end portions of the side frame members of the mower assembly adjacent the ends of said vertically adjustable support for binding the supporting bar for the stationary cutter blade against said spacer blocks, a reciprocatory carriage on said track way, and a motor-driven grinding wheel mounted on said carriage with provision for rotatable adjustment about a vertical axis, said grinding wheel also having provision for vertical adjustment and horizontal adjustment transversely of the carriage whereby to be selectively positioned to operate circumferentially and also sidewise upon the stationary cutter blade and being capable of readjustment to operate circumferentially upon the cutter blades of the assembled reel element.

BURR S. ROGERS.